(12) United States Patent
Schaub et al.

(10) Patent No.: US 11,296,774 B2
(45) Date of Patent: Apr. 5, 2022

(54) SEQUENCE BASED ANTENNA PAIRING

(71) Applicant: Intel Corporation, Santa Clara, CA (US)

(72) Inventors: Jens Schaub, Sankt Leon-Rot (DE); Cornelius Claussen, Bad Schoenborn (DE); Julian Raedel, Malsch (DE)

(73) Assignee: INTEL CORPORATION, Santa Clara, CA (US)

( * ) Notice: Subject to any disclaimer, the term of this patent is extended or adjusted under 35 U.S.C. 154(b) by 164 days.

(21) Appl. No.: 15/856,106

(22) Filed: Dec. 28, 2017

(65) Prior Publication Data

US 2019/0044603 A1 Feb. 7, 2019

(51) Int. Cl.
| | |
|---|---|
| H04B 7/08 | (2006.01) |
| H04B 7/024 | (2017.01) |
| H04B 7/0404 | (2017.01) |
| H04B 7/06 | (2006.01) |
| H04B 7/10 | (2017.01) |
| H04W 76/14 | (2018.01) |
| H04W 4/02 | (2018.01) |

(52) U.S. Cl.
CPC ........... *H04B 7/0808* (2013.01); *H04B 7/024* (2013.01); *H04B 7/0404* (2013.01); *H04B 7/0697* (2013.01); *H04B 7/082* (2013.01); *H04B 7/10* (2013.01); *H04W 4/02* (2013.01); *H04W 76/14* (2018.02)

(58) Field of Classification Search
None
See application file for complete search history.

(56) References Cited

U.S. PATENT DOCUMENTS

| | | | | |
|---|---|---|---|---|
| 6,370,369 | B1* | 4/2002 | Kraiem | H04L 12/40052 455/277.1 |
| 9,836,049 | B1* | 12/2017 | Tu | H04W 64/003 |
| 2003/0083016 | A1* | 5/2003 | Evans | H04B 7/0691 455/67.11 |
| 2004/0156339 | A1* | 8/2004 | Urquhart | H01Q 21/205 370/334 |
| 2005/0285792 | A1* | 12/2005 | Sugar | G01S 5/0226 342/465 |
| 2007/0030206 | A1* | 2/2007 | Fontaine | H04B 7/0814 343/725 |
| 2007/0169151 | A1* | 7/2007 | Vishloff | H01Q 1/246 725/62 |
| 2010/0207804 | A1* | 8/2010 | Hayward | G01S 7/414 342/28 |

(Continued)

*Primary Examiner* — Christopher T Wyllie
(74) *Attorney, Agent, or Firm* — Viering, Jentschura & Partner mbB

(57) ABSTRACT

Herein is disclosed an antenna pairing system comprising a first plurality of antennas configured to receive an ordered set of transmissions; a signal strength measuring circuit, configured to measure a received signal strength of transmissions within the ordered set of transmissions as received by the first plurality of antennas; one or more processors, configured to identify a pairing transmission, the pairing transmission being a transmission from the ordered set of transmissions having a received signal strength fulfilling a predefined criterion, according to the signal strength measuring circuit; and identify an antenna of the first plurality of antennas at which the pairing transmission was received.

18 Claims, 6 Drawing Sheets

(56) References Cited

U.S. PATENT DOCUMENTS

| | | | |
|---|---|---|---|
| 2011/0317625 A1* | 12/2011 | Urquhart | H04W 16/10 |
| | | | 370/328 |
| 2012/0099474 A1* | 4/2012 | Gauthier | H04B 7/0667 |
| | | | 370/252 |
| 2012/0114025 A1* | 5/2012 | Gauthier | H04B 7/0811 |
| | | | 375/219 |
| 2016/0316480 A1* | 10/2016 | Oh | H04B 7/0608 |
| 2017/0078004 A1* | 3/2017 | Capar | H04B 7/0617 |
| 2018/0054251 A1* | 2/2018 | Alex | G01S 19/54 |
| 2018/0212669 A1* | 7/2018 | Li | H04B 7/0604 |
| 2018/0319495 A1* | 11/2018 | Tu | H04W 4/029 |
| 2019/0049943 A1* | 2/2019 | Xue | G08G 5/0069 |
| 2019/0064308 A1* | 2/2019 | Erad | G01S 3/043 |

* cited by examiner

SEQUENCE BASED ANTENNA PAIRING

TECHNICAL FIELD

Various aspects of the disclosure relate generally to antenna pairing between transmitting and receiving devices.

BACKGROUND

Changes in location or position may impair a wireless communication during vehicle locomotion. This may occur, for example, in the case of an unmanned aerial vehicle (UAV) with respect to its controller or base station. Many UAVs are equipped with a single linearly polarized antenna, which is used to communicate with a base station, often also equipped with a single linearly polarized antenna. As the UAV turns, its body may tilt substantially, thereby altering the polarization and potentially disturbing the wireless connection. Moreover, one or more portions of the UAV or its equipment may be caused to come between the two antennas, and thereby create a shadowing effect which impairs the wireless connection. It is thereby desired to create a more robust wireless communication antenna pairing process.

SUMMARY

Herein is disclosed an antenna pairing system comprising a first plurality of antennas configured to receive an ordered set of transmissions; a signal strength measuring circuit, configured to measure a received signal strength of transmissions within the ordered set of transmissions as received by the first plurality of antennas; one or more processors, configured to identify a pairing transmission, the pairing transmission being a transmission from the ordered set of transmissions having a received signal strength fulfilling a predefined criterion, according to the signal strength measuring circuit; and identify an antenna of the first plurality of antennas at which the pairing transmission was received.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
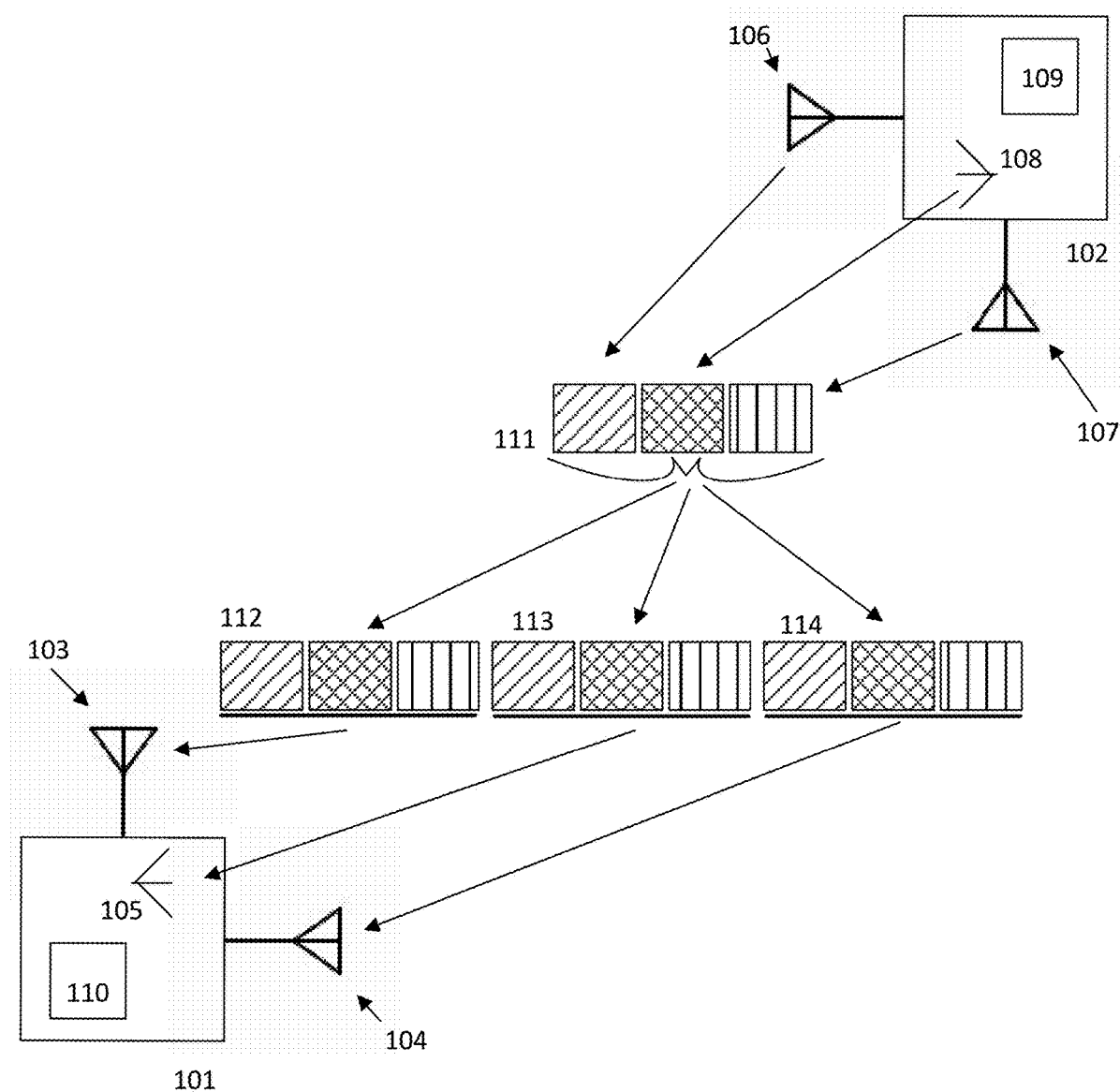
FIG. 1 shows an antenna sequence pairing procedure between a UAV and a base station.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any example or design described herein as "exemplary" is not necessarily to be construed as preferred or advantageous over other examples or designs.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

Numerous events may impair wireless communication between a UAV and a controller or base station. It is known to equip a UAV with a single, linearly polarized antenna, which connects to a controller or base station also possessing a single linearly polarized antenna. Under certain circumstances, the polarization matching of the transmit and receive antennas (corresponding to the UAV and the base station) may be impaired or interrupted based on a maneuver of the UAV. For instance, while making a turn or performing a curving maneuver, the UAV will typically need to angle its body such that it is no longer horizontal or parallel to the earth. Where the single linearly polarized antenna has a vertical aspect to its orientation, the antenna polarization may be altered by the reorientation associated with the change in angle. This may result in a detrimental effect to the wireless communication. This effect is not limited to instances of a single antenna, but may be seen in instances of multiple antennas. It is anticipated that, particularly where antennas possess a similar alignment, or in alignment with a substantial vertical element, tilting or shifting of angle may alter the antenna polarization. Similarly, where an antenna orientation has a horizontal element, a rotational movement of the UAV may also alter the antenna polarization.

It is also known to place a UAV antenna within a UAV body. This may occur to protect the UAV antenna, such as to prevent damage to the UAV antenna during landing or maneuvering around other objects. This may present special difficulties, such as interference from other UAV components. For example, many UAVs may be equipped with a camera, which may be housed next to or near a UAV antenna. Depending on the UAV orientation, the camera may come between a UAV antenna and a base station antenna, and thereby create a shadowing effect, which will dampen or lessen signal strength.

In addition, the orientation of the UAV may cause an undesirable antenna orientation, such that a resulting antenna pattern is unsuitable or undesirable for communication with the base station.

UAV wireless communication with a base station may be improved by providing the UAV and/or the base station with a plurality of antennas. According to one aspect of the disclosure, the plurality of antennas may be oriented along a variety of axes, which may provide improved polarization and antenna pattern transmission options between the UAV and the base station. Herein is described a procedure of utilizing three antennas on the UAV and three antennas on the base station to improve wireless communication. It is expressly noted that the procedures and techniques described herein may be implemented with fewer or greater than three antennas. The number of antennas suitable for the methods and techniques described herein are generally unlimited, and may include either the UAV or the base station having as few as one antenna, while the other object possesses at least two antennas. In the event that a plurality of antennas are connected to the UAV and/or the base station, it becomes desirable to select a pair of antennas for transmission and/or reception. A person skilled in the art will appreciate that, due to movement of the UAV, signal reflection, and/or the nature of certain signals, such as centimeter wavelengths signals, a desirable selected pair of antennas may change very rapidly. Although the frequency with which the selected pair is expected to change may vary greatly depending on a variety of circumstances, the selected pair may conceivably change every 10 ms. As such, it is necessary to have a robust and rapid procedure for identifying a likely selected antenna pair.

FIG. 1 is an antenna pair selection procedure according to one aspect of the disclosure. This figure shows a base station 101 and a UAV 102, each of which are configured with three antennas. The base station 101 is configured with antennas 103-105, and the UAV 102 is configured with antennas 106-108. Each set of antennas is provided along three axes, such that antennas 104 and 106 are provided along an x-axis, antennas 103 and 107 are provided along a y-axis, and antennas 105 and 108 are provided along a z-axis. Both the base station 101 and the UAV 102 are further configured with one or more processors, 110 and 109 respectively.

A method of choosing a selected pair of antennas may be as follows. The UAV antennas 106-108 rapidly transmit in sequence, as shown by 111, to form a first portion of an ordered set of transmissions. This first portion includes a brief, ordered transmission from each of the three UAV antennas. This portion is repeated for each antenna on the base station 101. In this case, because the station 101 includes three antennas, this portion of three brief transmissions is repeated three times, as shown in 112, 113, and 114, thereby creating an ordered set of nine transmissions. According to one aspect of the disclosure, each transmission may be very brief, such that the ordered set of nine transmissions may include two hundred fifty-six bytes. According to another aspect of the disclosure, the transmission may be a raw sine wave transmission, without modulation. A raw sine wave transmission may be received and demodulated according to any known manner in the art. The order of the nine transmissions may be known to the base station.

According to one aspect of the disclosure, the base station may be limited to receiving or interpreting signals on only one antenna at a time. Where this is the case, the base station listens to the nine transmissions such that each antenna receives one portion of the ordered set of nine transmissions. As shown herein, antenna 103 receives the three transmissions indicated by 112; antenna 105 receives the three transmissions indicated by 113; and antenna 104 receives the three transmissions indicated by 114. The order of the receive antennas may be selected according to implementation or any variety of factors. The one or more processors 110 on the base station 101 evaluate the receive transmissions for greatest signal strength. Although any of the nine transmissions within 112-114 is expected to be repeated three times, these transmissions will likely be received with different signal strength, based at least on a position of the transmitting antenna relative to a position of the receiving antenna. Therefore, the receiving antennas listen as described herein to detect the one of the nine transmissions having the greatest signal strength. The receive antenna having received this transmission with the greatest signal strength is chosen as the best receive antenna for the antenna selection.

Figure 2:
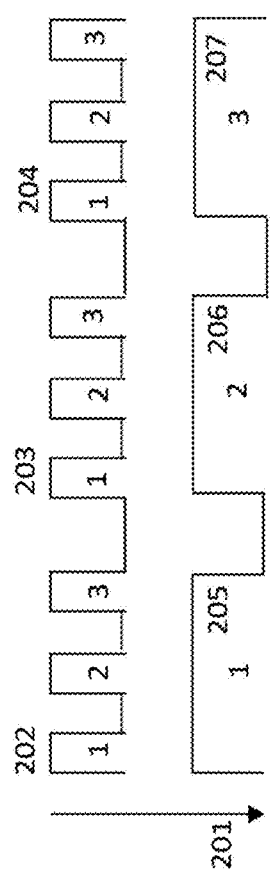
FIG. 2 depicts a sequence of transmissions for antenna sequence pairing and the receipt of said transmissions.

FIG. 2 shows an antenna transmission and evaluation scheme according to another aspect of the disclosure. The upper row of FIG. 2 depicts the transmissions from the transmitting bodies, and the bottom row depicts the receipt of said transmissions by the receiving antennas. For this example, "transmitting" and "receiving" are used to indicate that the procedure may originate in either a UAV or a base station. For simplicity, the procedures described herein will be depicted as originating in the UAV; however, they may also originate in the base station, and nothing to the contrary should be understood as being limiting. Prior to the transmission of the nine transmitting antenna transmissions, the receiving entity, such as the base station, may perform an initial measurement 201 to calculate a baseline signal strength. The initial measurement may be made on one, all, or any combination of the receive antennas. This initial measurement may be used as a basis of comparison to the additional transmissions to assist in determining a transmission with the highest signal strength. Upon initiation of the transmissions, nine transmissions are initiated in three clusters, wherein the first cluster 202 includes transmissions from the first, second, and third transmitting antenna; the second cluster 203 includes transmissions from the first, second, and third transmitting antennas; and the third cluster 204 includes transmissions from the first, second, and third transmitting antenna. The three receiving antennas on the base station listen to the clusters in series, such that the first receiving antenna 205 listens to the first cluster 202, the second receiving antenna 206 listens to the second cluster 203, and the third receiving antenna 207 listens to the third cluster 204.

Figure 3:
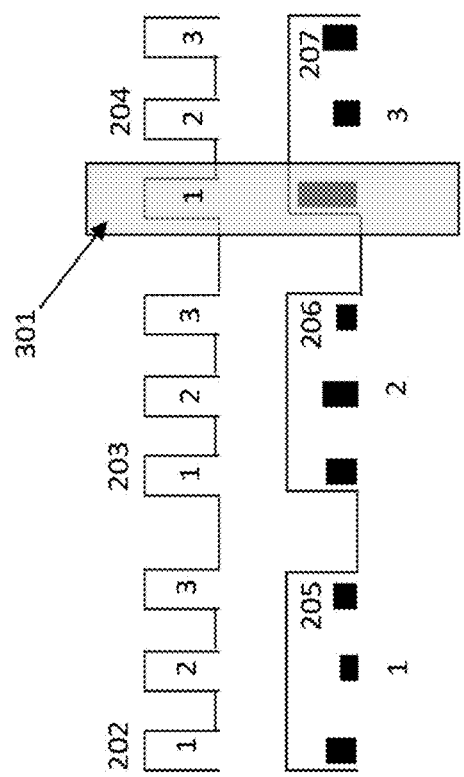
FIG. 3 depicts an evaluation of the sequence of transmissions and an identification of a base station antenna within a matched antenna pair.

FIG. 3 depicts a measure of signal strength and identification of an antenna match. As shown with respect to the prior figure, three clusters 202-204 listen to by three receive antennas 205-207, respectively. Each receive antenna evaluates the signal strength of the received signals, as shown by the vertical black bars in receive antenna blocks 205-207. In this case, it is depicted that the seventh transmission (corresponding to the first transmission of the third cluster 204) has the greatest signal strength. Because this seventh transmission was received by the third receive antenna 207, the base station may determine the third antenna 207 is the proper antenna for the next period of transmission or reception, otherwise known as a component within the matched antenna pair. Optionally, the base station may further calculate an identity of the corresponding transmitting antenna within the matched pair based on the order of transmission. The one or more processors of the base station may be aware of the order of the transmission signals, and therefore the seventh transmission signal (or the first transmission signal within a cluster) may be identified as the first transmission antenna, which can therefore establish the first transmitting antenna and the third receiving antenna as the matched pair. The matched pair in this instance is identified as 301. For reasons explained infra, certain implementations may not require the receiving antenna or base station to determine an identity of the matched transmitting antenna.

Figure 4:
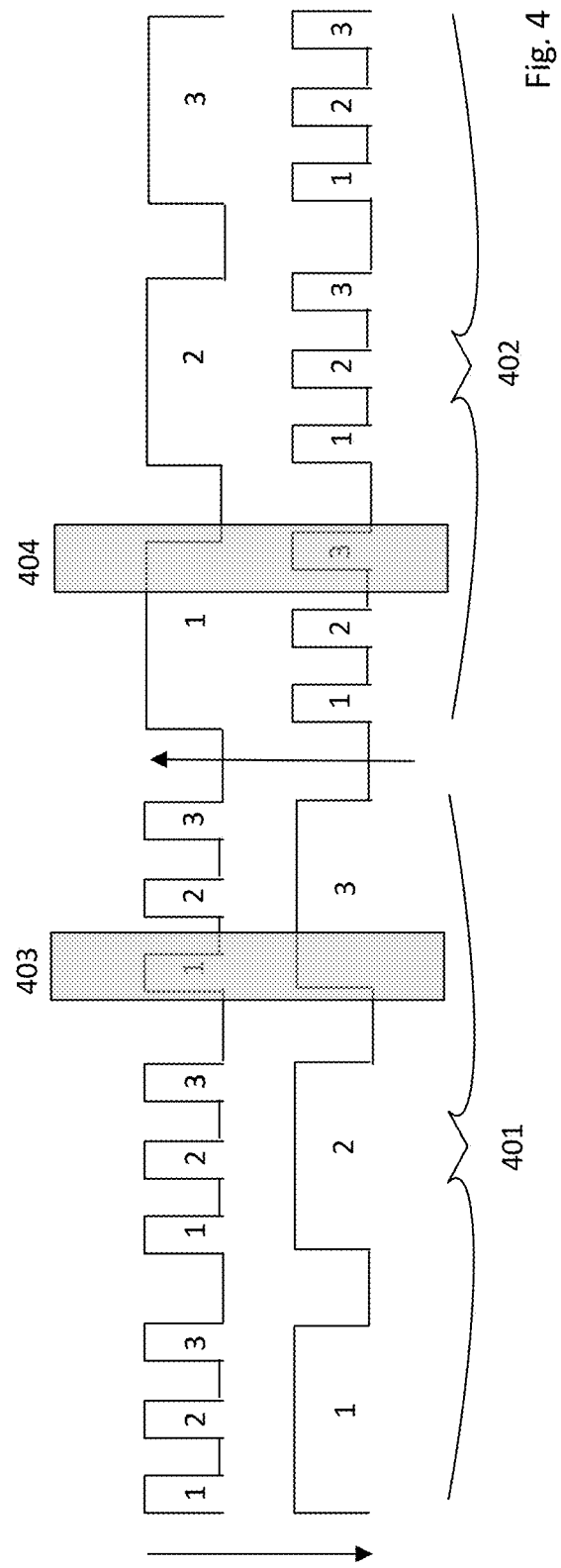
FIG. 4 depicts a bi-directional antenna sequence pairing transmission.

FIG. 4 shows a method of determining a matched pair of transmit and receive antennas. This figure depicts a series of transmissions in a first direction 401 followed by a series of transmissions in a second direction 402. In this case, and using the same example direction, the UAV transmits three clusters of three transmissions from an ordered series of three transmitting antennas, totaling nine transmissions. The three clusters are listened to in sequence by the three receiving antennas and evaluated for signal strength. As above, the seventh transmission has the greatest received signal strength, depicted as 403, and therefore the third receiving antenna is selected as the receive antenna for the matched pair. At this point, the base station knows its best receiving antenna and has the ability to calculate a best transmitting antenna; however, the UAV has received no information regarding the best matched antenna pair.

Accordingly, the base station may then initiate a mirrored-image series of transmissions 402, designed to permit the UAV to identify a best antenna. As was performed by the UAV, the base station now sends a series of three clusters, each cluster including a brief transmission from a first antenna, a second antenna, and the third antenna, totaling nine transmissions in all. Each cluster is listened to by the UAV using a first receiving antenna, a second receiving antenna, and a third receiving antenna. This mirrored image transmission may similarly be two hundred fifty-six bytes. Because these two transmissions can occur rapidly it is expected that the matched pair identified during the transmissions from the UAV to the base station will largely mirror the matched pair identified in the transmissions from the base station to the UAV. This is depicted as 404, which is derived from the UAV evaluating the signal strength of each of the nine transmissions, identifying a transmission of the nine transmissions having the greatest signal strength, and identifying a receive antenna that received the transmission having the greatest signal strength. Just as the base station identified its third receive antenna as being the best receive antenna for the matched pair (and had the option of identifying the first transmission antenna as being the best antenna for the matched pair), so too has the UAV identified the first UAV antenna as being the best antenna for the matched pair (and has the ability to determine the third base station antenna as being the best antenna for the matched pair, based on the sequence of transmissions). Thus, each object at least having determine its own preferable antenna for the antenna pairing, the base station and UAV may transmit or receive according to the chosen antenna pair. A frequency of antenna pair selection may be determined based on the implementation. According to one aspect of the disclosure, this method of selecting an antenna pair may occur every modem frame, or every five point 5 ms.

Figure 5:
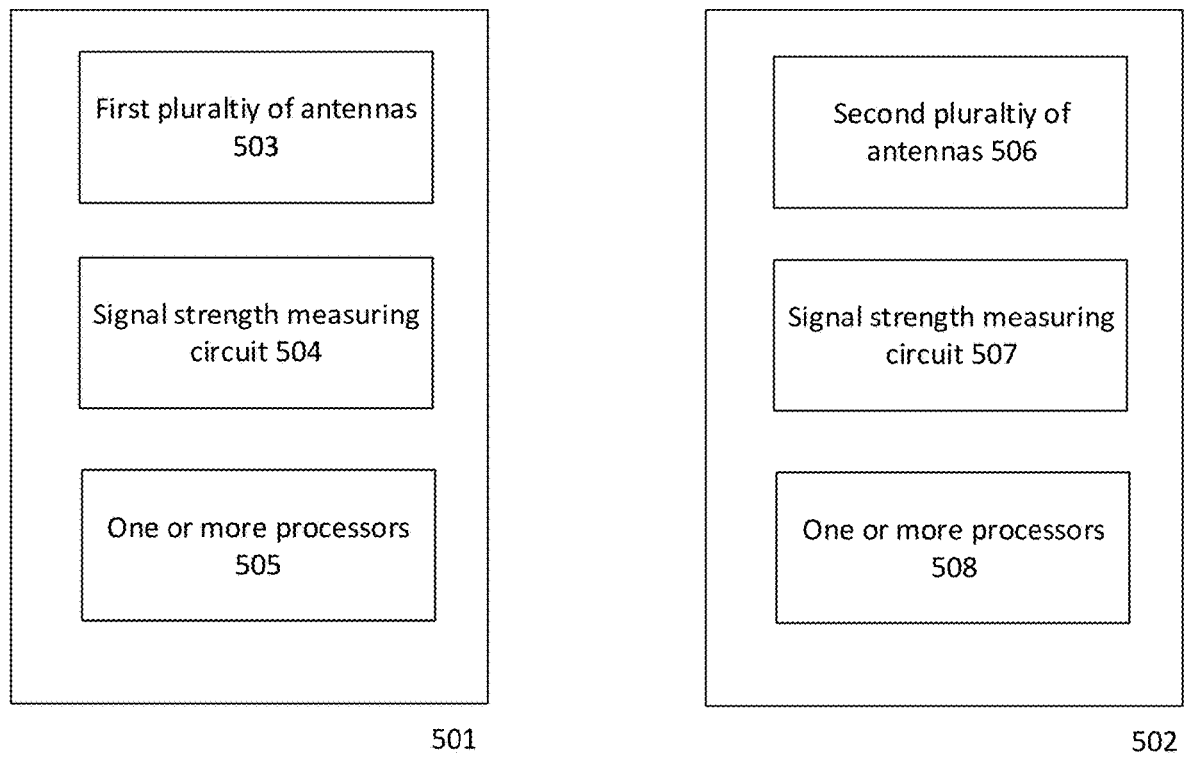
FIG. 5 depicts a system for antenna pairing.

FIG. 5 shows an antenna pairing system for a first unit 501 and a second unit 502, the first unit including a first plurality of antennas 503 configured to receive an ordered set of transmissions; a signal strength measuring circuit 504, configured to measure a received signal strength of transmissions within the ordered set of transmissions as received by the first plurality of antennas 503; one or more processors 505, configured to identify a pairing transmission, the pairing transmission being a transmission from the ordered set of transmissions having a received signal strength fulfilling a predefined criterion, according to the signal strength measuring circuit; and identify an antenna of the first plurality of antennas at which the pairing transmission was received.

The first unit 501 may be further configured to resolve an origin antenna of the pairing transmission among the second plurality of antennas 506. The first unit 501 may be further configured to transmit a second ordered set of transmissions from the first plurality of antennas 503 to the second plurality of antennas 506. The second unit 502 may be configured to receive the second ordered set of transmissions; to implement a signal strength measuring circuit 507, configured to measure a received signal strength of transmissions within the second ordered set of transmissions as received by the second plurality of antennas; and to implement one or more processors 508, configured to identify a pairing transmission, the pairing transmission being a transmission from the second ordered set of transmissions having a received signal strength fulfilling a predefined criterion, according to the signal strength measuring circuit 507; and identify an antenna of the second plurality of antennas 506 at which the pairing transmission was received. For either or both units, the predefined criterion may be, for example, a greatest signal strength.

Figure 6:
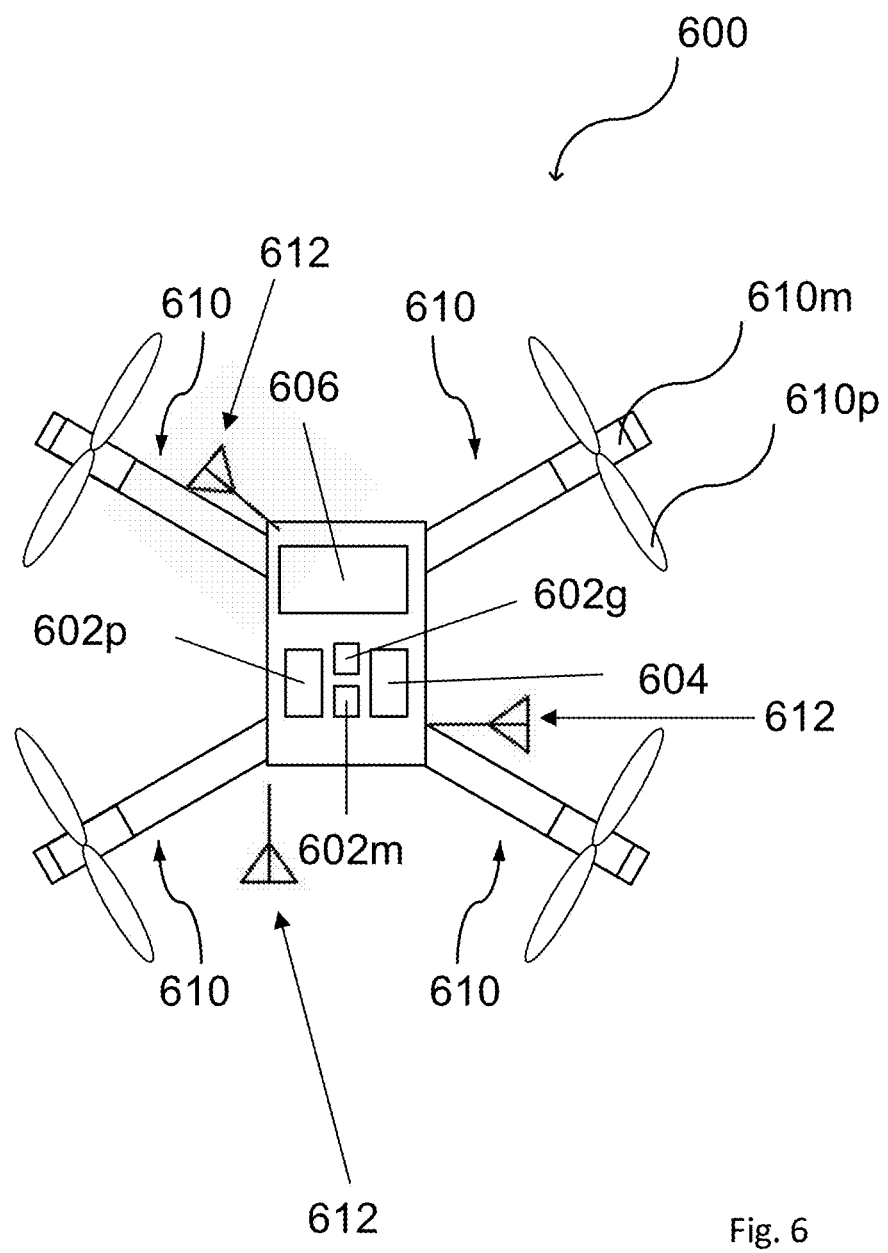
FIG. 6 shows a UAV according to an aspect of the disclosure.

FIG. 6 illustrates an unmanned aerial vehicle 600 in a schematic view, according to various aspects of the disclosure. The unmanned aerial vehicle 600 may include a plurality of (e.g., three or more than three, e.g., four, six, eight, etc.) vehicle drive arrangements 610. Each of the vehicle drive arrangements 660 may include at least one drive motor 660m and at least one propeller 660p coupled to the at least one drive motor 660m. The one or more drive motors 660m of the unmanned aerial vehicle 600 may be electric drive motors.

Further, the unmanned aerial vehicle 600 may include one or more processors 602p configured to control flight or any other operation of the unmanned aerial vehicle 600 including but not limited to navigation, image analysis, location calculation, and any method or action described herein. One or more of the processors 602p may be part of a flight controller or may implement a flight controller. The one or more processors 602p may be configured, for example, to provide a flight path based at least on an actual position of the unmanned aerial vehicle 600 and a desired target position for the unmanned aerial vehicle 600. In some aspects, the one or more processors 602p may control the unmanned aerial vehicle 600. In some aspects, the one or more processors 602p may directly control the drive motors 660m of the unmanned aerial vehicle 600, so that in this case no additional motor controller may be used. Alternatively, the one or more processors 602p may control the drive motors 660m of the unmanned aerial vehicle 600 via one or more additional motor controllers. The one or more processors 602p may include or may implement any type of controller suitable for controlling the desired functions of the unmanned aerial vehicle 600. The one or more processors 602p may be implemented by any kind of one or more logic circuits.

According to various aspects, the unmanned aerial vehicle 600 may include one or more memories 602m. The one or more memories may be implemented by any kind of one or more electronic storing entities, e.g. a one or more volatile memories and/or one or more non-volatile memories. The one or more memories 602m may be used, e.g., in interaction with the one or more processors 602p, to build and/or store image data, ideal locations, locational calculations, or alignment instructions.

Further, the unmanned aerial vehicle 600 may include one or more power supplies 604. The one or more power supplies 604 may include any suitable type of power supply, e.g., a directed current (DC) power supply. A DC power supply may include one or more batteries (e.g., one or more rechargeable batteries), etc.

According to various aspects, the unmanned aerial vehicle 600 may include one or more sensors 606. The one or more sensors 606 may be configured to monitor a vicinity of the unmanned aerial vehicle 600. The one or more sensors 606 may be configured to detect obstacles in the vicinity of the unmanned aerial vehicle 600. The one or more sensors 606 may include, for example and without limitation, one or more cameras (e.g., a still camera, a video camera, a conventional color camera, a depth camera, a stereo camera, a thermal imaging camera, etc.), one or more ultrasonic sensors, etc. The unmanned aerial vehicle 600 may further include a position detection system 602g. The position detection system 602g may be based, for example, on Global Positioning System (GPS) or any other available positioning technology. Therefore, the one or more processors 602p may be further configured to modify the flight path of the unmanned aerial vehicle 600 based on data obtained from the position detection system 602g. The sensors 606 may be mounted as depicted herein, or in any other configuration suitable for an implementation.

According to various aspects, the one or more processors 602p may include at least one transceiver configured to provide an uplink transmission and/or downlink reception of radio signals including data, e.g. video or image data and/or commands. The at least one transceiver may include a radio frequency (RF) transmitter and/or a radio frequency (RF) receiver.

The one or more processors 602p may further include an inertial measurement unit (IMU) and/or a compass unit. The inertial measurement unit may allow, for example, a calibration of the unmanned aerial vehicle 600 regarding a predefined plane in a coordinate system, e.g., to determine the roll and pitch angle of the unmanned aerial vehicle 600 with respect to the gravity vector (e.g. from planet earth).

Thus, an orientation of the unmanned aerial vehicle 600 in a coordinate system may be determined. The orientation of the unmanned aerial vehicle 600 may be calibrated using the inertial measurement unit before the unmanned aerial vehicle 600 is operated in flight modus. However, any other suitable function for navigation of the unmanned aerial vehicle 600, e.g., for determining a position, a flight velocity, a flight direction, etc., may be implemented in the one or more processors 602p and/or in additional components coupled to the one or more processors 602p.

As described herein, the unmanned aerial vehicle may be equipped with one or more antennas for receiving and/or transmitting a wireless signal. The number of antennas may be configured to meet the needs of the desired implementation and may range from one to an infinite number. In this case, three antennas 612 are identified as being configured for operation with the unmanned aerial vehicle. In this case, the three antennas 612 are configured on a plurality of axes, such that a first antenna is oriented on an x-axis, a second antenna, is oriented on a Y axis, and the third antenna is oriented on a z-axis.

Figure 7:
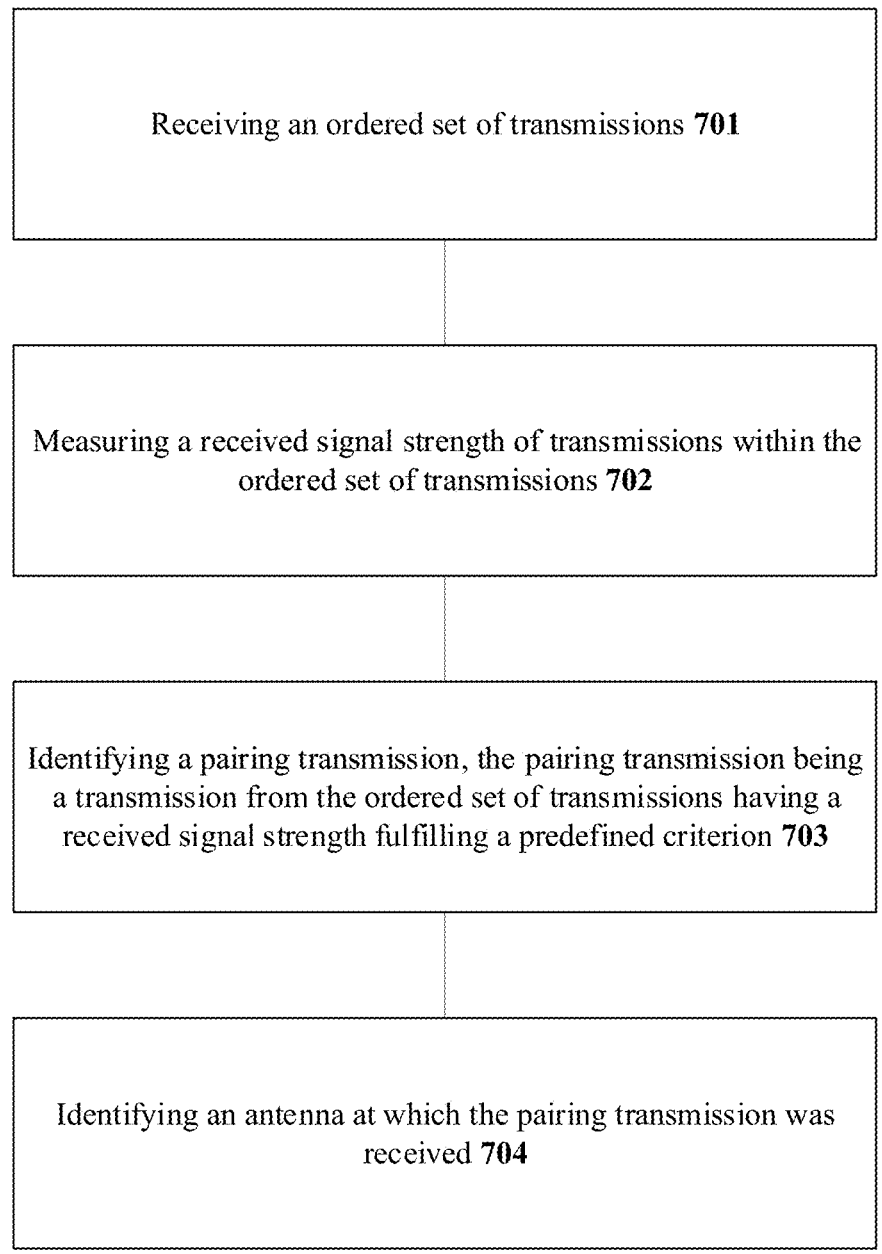
FIG. 7 shows a method for antenna pairing according to an aspect of the disclosure.

FIG. 7 shows a method of antenna pairing comprising receiving an ordered set of transmissions 701, measuring a received signal strength of transmissions within the ordered set of transmissions 702; identifying a pairing transmission, the pairing transmission being a transmission from the ordered set of transmissions having a received signal strength fulfilling a predefined criterion 703; and identifying an antenna at which the pairing transmission was received 704.

As described herein, and after determining an antenna for the matched pair, the first unit (receive device) may carry out a variety of additional options. According to one aspect of the disclosure, the first unit may resolve an origin antenna of the pairing transmission among a second plurality of antennas. In the example with a UAV transmitting the series of nine transmissions to the base station, the base station may, after determining a base station antenna as a member of the matched pair, resolve the origin of the transmission with the greatest signal strength to determine a UAV antenna as the other member of the matched pair. This information may be used, as described herein, to optionally transmit an identity of the perceived match UAV antenna to the UAV. Using this method, the base station may transmit a transmission containing the identity of the UAV antenna within the matched pair once, or on each of its receivers and/or over a period of nine transmissions. Because the UAV may include a modem that is incapable of listening to multiple antennas for received signals at a given time, the UAV may be preprogrammed to listen to a first antenna, a second antenna, and a third antenna in series. As such, and where it is desired to actually transmit an identity of the UAV antenna for the matched pair, the identity may need to be transmitted repeatedly, such that it may be heard by the UAV's receiving antennas in the succession of listening performed by the modem. Alternatively, the base station may be configured to transmit only the identity of the UAV matched pair antenna during the portion of time that would correspond to the listening by the matched pair antenna. That is, where the UAV antenna two is the antenna for the matched pair, the base station may be configured to transmit the identity within slots four, five, and six of the nine-slot transmission, since slots 4-6 correspond to the second receiving antenna.

The base station (or unit one) may be configured to transmit to the UAV a series of transmissions similar to the first nine-transmission series, in order for the UAV to determine the best antenna for the matched pair. Assuming, for simplicity, that the base station and the UAV each have three antennas, the base station would transmit three clusters of signals, each cluster including a signal from the first, second, and third base station antennas. This transmission may be a mirror of the transmission received from the UAV. In a similar fashion, the UAV listens to each cluster with a different antenna, such that the first cluster is listen to by the first antenna, the second clusters listen to by the second antenna, and the third cluster is listen to by the third antenna. The UAV listens to each transmission within each cluster and evaluates the transmissions for a greatest signal strength. The UAV identifies the transmission having the greatest received signal strength and identifies a corresponding receive antenna for that transmission. That corresponding receive antenna is selected as the matched pair antenna for subsequent transmissions. The UAV may further, optionally, correlate the transmission with the greatest signal strength to a base station transmit antenna, based on the order of transmission.

The base station and/or the UAV may have a plurality of antennas arranged along a plurality of axes. For demonstrative purposes, the UAV and base station may have antennas arranged along an x-axis, a y-axis, and a z-axis. Antennas are not limited to the three Cartesian axes, but rather may be arranged in any configuration desired. The antennas may be arranged such that multiple antennas are along the same axis. The antennas may be arranged along a plurality of axes, such that the antennas include elements of at least two of a horizontal, vertical, or depth directions.

According to one aspect of the disclosure, the arrangement of antennas in the UAV may be identical to the arrangement of antennas in the base station. That is, whatever the arrangement of antennas in the UAV along axes as described above, the arrangement in the base station may mirror the arrangement of the UAV. Providing the antennas in this manner may simplify identification of matched pairs by providing similar diversity among antenna sets.

According to another aspect of the disclosure, it may become undesirable for any number of reasons for the disposition of antennas in the UAV to match a disposition of antennas in the base station. Where this occurs, the antennas may be configured similarly, such that the axes on which the antennas and the UAV are disposed differ from the axes on which the antennas on the base station are disposed. Similarly, the number of antennas dedicated to a certain axes in the UAV may differ from a number of antennas dedicated to the same axis in the base station. Where antennas are arranged according to a combination of horizontal, vertical, or depth (z-axis) elements, this combination may differ in the UAV from the combination and the base station.

The base station may be any station designed for controlling a remote vehicle. The station may be portable or fixed-mounted. The station may include antennas and the one or more processors in its own self-contained unit, or may rely on connection to an external computing device, such as a laptop, desktop, or other CPU, to provide the processing functions described herein as the one or more processors.

Although the term UAV is used throughout for simplicity, the object referred to herein as a UAV may alternatively be configured as any kind of vehicle. This may include, for example, a motor vehicle, such as a car, truck, tractor, or otherwise. It may include an autonomous driving vehicle, or a vehicle with driver assistance.

The antennas used herein may be linearly polarized antennas. The polarization may be horizontal or vertical, or any combination thereof, without limitation. The antennas used herein may alternatively be circularly polarized, or a combination thereof.

The ordered set of transmissions received from the plurality of antennas, whether from the UAV to the base station, or from the base station to the UAV, may be configured in a variety of manners, depending on the desired application. According to one aspect of the disclosure, the transmissions may be grouped as depicted in the figures herein, wherein the antennas alternate to form transition clusters, each transition cluster being repeated to correspond to the number of receive antennas. In this manner, each receive antenna listens for a longer period than any individual transmitting antenna transmit at a given time.

According to another aspect of the disclosure, the transmissions may be arranged inversely, such that the transmitting antennas transmit for a longer time than any individual listening antenna listens. In this manner, the transmitting antennas may transmit in nonidentical clusters, such that, using the example of three transmitting and three receiving antennas as described throughout herein, the first cluster includes only transmissions of the first antenna; the second cluster includes only transmissions of the second antenna; and the third cluster includes only transmissions of the third antenna. Under this configuration, the listening antennas must listen in succession for each cluster, such that the first, second, and third listening antenna listen to the first cluster; the first, second, and third listening antenna listen to the second cluster; and the first, second, and third listening antenna listen to the third cluster. This is an alternative arrangement, and any of the principles described herein may be adapted in accordance with this alternative listening arrangement.

According to another aspect of the disclosure, the base station or receiving unit may be configured not to provide a mirror image of transmissions from the base station to the UAV, but may rather transmit entirely on a preferred antenna. Thus, as in the examples described herein, where the third listening antenna was deemed the candidate antenna for the antenna match, the base station may transmit the next series of transmissions to the UAV only on the third antenna. Although this may prevent the UAV from discovering a potentially better match with another base station antenna, it represents a calculation that the best match has already been determined, and it increases the likelihood that the UAV will choose an antenna best corresponding to the selected antenna at the base station. Where desired, any of the methods described herein may be adapted according to this implementation.

Where one or both of the UAV and base station are equipped with a modem that can listen to a plurality of antennas simultaneously, the transmission schema disclosed herein may be amended to include simultaneous transmission of a plurality of antennas. Thus, the UAV may transmit the first cluster, including a brief transmission from the first, second, and third antenna, which may be simultaneously received by each receiving antenna of the base station. Thus, upon completion of the first cluster, the base station may be able to determine a receive antenna for the antenna match. This may also be repeated in the opposite direction, assuming that the UAV is equipped with a modem that permits simultaneous listening among the plurality of antennas.

Where it is desired that the base station resolves an identity of the UAV transmitting antenna within the antenna match, the sequence of the ordered set of transmissions may be communicated to the base station, or preprogrammed within the base station. Where the base station has knowledge of the sequence of UAV transmissions, the base station may have the capacity to identify a received transmission with the greatest signal strength, and to resolve from that transmission the specific identity of the transmitting antenna. Knowledge of this information may permit the base station to transmit an identity of the selected transmitting antenna to the UAV.

According to an aspect of the disclosure, the transmitting packets from the UAV to the base station and from the base station to the UAV may be minimized to allow rapid transmission within a frame, and to permit additional payload within the frame. According to one aspect of the disclosure, each packet may be two hundred fifty-six bytes. The packets may be smaller than two hundred fifty-six bytes, or greater than two hundred fifty-six bytes, depending on the desired implementation.

The transmission structure described herein may be configured to be repeated every frame. A given modem may divide transmission time into a plurality of frames, and each frame may begin with the series of transmissions described herein, such that the remainder of the frame may be transmitted according to a matched set of antennas. The length of the frame may be determined based on the modem used. According to one aspect of the disclosure, the frame may be 5.5 ms. According to another aspect of the disclosure, the frame may be less than 5.5 ms or greater than 5.5 ms.

Although the transmission scheme described herein has principally been described as initiating within the UAV, the method may instead initiate within a base station. Under this rubric, the base station may initiate the ordered set of transmissions to the UAV, and the UAV, depending on the implementation, may subsequently transmit to the base station using any of the methods or principles described herein related to the second or response transmission. Thus, any of the methods or principles described herein may originate in a UAV or in a base station. Nothing herein should be understood as limiting the transmission to originating in either the UAV or the base station, since either point of origination is possible. In order to emphasize the flexibility of the order, the transmitting elements may be referred to as a first set of antennas and a second set of antennas, so as not to be limited by the particular object initiating the transmission.

In the following, various examples are provided with reference to the aspects described above.

In Example 1, an antenna pairing system is disclosed comprising a first plurality of antennas configured to receive an ordered set of transmissions; a signal strength measuring circuit, configured to measure a received signal strength of transmissions within the ordered set of transmissions as received by the first plurality of antennas; one or more processors, configured to identify a pairing transmission, the pairing transmission being a transmission from the ordered set of transmissions having a received signal strength fulfilling a predefined criterion, according to the signal strength measuring circuit; and identify an antenna of the first plurality of antennas at which the pairing transmission was received.

In Example 2, the antenna pairing system of claim 1 is disclosed, wherein the predefined criterion is that the pairing transmission is a transmission from the ordered set of transmissions having a greatest received signal strength.

In Example 3, the antenna pairing system of any one of claim 1 or 2 is disclosed, wherein the one or more processors are further configured to transmit a second ordered set of transmissions from the first plurality of antennas to the second plurality of antennas.

In Example 4, the antenna pairing system of any one of claims 1 to 3 is disclosed, wherein the one or more processors are further configured to resolve an origin antenna of the pairing transmission among the second plurality of antennas.

In Example 5, the antenna pairing system of claim 4 is disclosed, wherein the one or more processors are further configured to transmit an identity of the resolved origin antennas to the second plurality of antennas.

In Example 6, the antenna pairing system of any one of claims 1 to 5 is disclosed, wherein the first plurality of antennas is further configured to receive the ordered set of transmission from a second plurality of antennas.

In Example 7, the antenna pairing system of any one of claims 1 to 6 is disclosed, wherein the first plurality of antennas is arranged along a first plurality of axes.

In Example 8, the antenna pairing system of any one of claims 1 to 7 is disclosed, wherein the second plurality of antennas is arranged along a second plurality of axes.

In Example 9, the antenna pairing system of any one of claim 8 is disclosed, wherein the first plurality of axes is identical to the second plurality of axes.

In Example 10, the antenna pairing system of any one of claims 1 to 9 is disclosed, wherein the first plurality of antennas comprises at least three antennas arranged at least according to an x-axis, a y-axis, and a z-axis.

In Example 11, the antenna pairing system of any one of claims 1 to 10 is disclosed, wherein the second plurality of antennas comprises at least three antennas arranged at least according to an x-axis, a y-axis, and a z-axis.

In Example 12, the antenna pairing system of any one of claims 1 to 11 is disclosed, wherein the first plurality of antennas is in a base station.

In Example 13, the antenna pairing system of any one of claims 1 to 12 is disclosed, wherein the second plurality of antennas is a plurality of antennas of an unmanned aerial vehicle.

In Example 14, the antenna pairing system of any one of claims 1 to 12 is disclosed, wherein the second plurality of antennas is a plurality of antennas of a vehicle.

In Example 15, the antenna pairing system of any one of claims 1 to 14 is disclosed, wherein the first plurality of antennas comprises linearly polarized antennas.

In Example 16, the antenna pairing system of any one of claims 1 to 15 is disclosed, wherein the second plurality of antennas comprises linearly polarized antennas.

In Example 17, the antenna pairing system of any one of claims 1 to 16 is disclosed, wherein the one or more processors are configured to receive the ordered set of transmissions from each of the first plurality of antennas in succession.

In Example 18, the antenna pairing system of any one of claims 1 to 16 is disclosed, wherein the one or more processors are further configured to receive the ordered set of transmissions from each of the first plurality of antennas simultaneously.

In Example 19, the antenna pairing system of any one of claims 1 to 18 is disclosed, wherein an order of the ordered set of transmissions is known to the one or more processors.

In Example 20, the antenna pairing system of any one of claims 1 to 19 is disclosed, wherein the ordered set of transmissions is a 256 byte packet.

In Example 21, the antenna pairing system of any one of claims 1 to 20 is disclosed, wherein the one or more processors are configured to receive the ordered set of transmissions every transmission frame.

In Example 22, the antenna pairing system of claim 19 is disclosed, wherein the transmission frame is 5.5 milliseconds.

In Example 23, the antenna pairing system of any one of claims 1 to 22 is disclosed, wherein an order of antennas transmitting from the second plurality of antennas is known to the one or more processors for the first plurality of antennas.

In Example 24, the antenna pairing system of any one of claims 3 to 23 is disclosed, wherein the order of antennas transmitting from the first plurality of antennas is known to the one or more processors for the second plurality of antennas.

In Example 25, the antenna pairing system of any one of claims 1 to 24 is disclosed, further comprising the second plurality of antennas, configured to receive a second ordered set of transmissions from the first plurality of antennas; a second signal strength measuring circuit, configured to measure a received signal strength of transmissions within the second ordered set of transmissions as received by the second plurality of antennas; one or more second processors, configured to identify a second pairing transmission, the second pairing transmission being a transmission from the second ordered set of transmissions having a greatest received signal strength, according to the second signal strength measuring circuit; and identify an antenna of the second plurality of antennas at which the second pairing transmission was received.

In Example 26, a antenna pairing system is disclosed, comprising a first station, further comprising a first plurality of antennas configured to receive an ordered set of transmissions; a signal strength measuring circuit, configured to measure a received signal strength of transmissions within the ordered set of transmissions as received by the first plurality of antennas; one or more processors, configured to identify a pairing transmission, the pairing transmission being a transmission from the ordered set of transmissions having a received signal strength fulfilling a predefined criterion, according to the signal strength measuring circuit; and identify an antenna of the first plurality of antennas at which the pairing transmission was received; and the second station, further comprising the second plurality of antennas configured to receive a second ordered set of transmissions; a second signal strength measuring circuit, configured to measure a received signal strength of transmissions within the second ordered set of transmissions as received by the second plurality of antennas; one or more second processors, configured to identify a second pairing transmission, the second pairing transmission being a transmission from the second ordered set of transmissions having a received signal strength fulfilling a predefined criterion, according to the second signal strength measuring circuit; and identify an antenna of the second plurality of antennas at which the second pairing transmission was received.

In Example 27, a method for antenna pairing is disclosed, comprising receiving an ordered set of transmissions; measuring a received signal strength of transmissions within the ordered set of transmissions; identifying a pairing transmission, the pairing transmission being a transmission from the ordered set of transmissions having a received signal strength fulfilling a predefined criterion; and identifying an antenna at which the pairing transmission was received.

In Example 28, the method for antenna pairing of claim 27 is disclosed, wherein the predefined criterion is that the pairing transmission is a transmission from the ordered set of transmissions having a greatest received signal strength.

In Example 29, the method for antenna pairing of claim 27 is disclosed, further comprising transmitting a second ordered set of transmissions from the first plurality of antennas to a second plurality of antennas.

In Example 30, the method for antenna pairing of any one of claims 27 to 29 is disclosed, further comprising receiving the ordered set from a second plurality of antennas.

In Example 31, the method for antenna pairing of claim 30 is disclosed, further comprising transmitting an identity of the resolved origin antennas to the second plurality of antennas.

In Example 32, the method for antenna pairing of any one of claims 27 to 31 is disclosed, wherein the first plurality of antennas is arranged along a first plurality of axes.

In Example 33, the method for antenna pairing of any one of claims 27 to 31 is disclosed, wherein the second plurality of antennas is arranged along a second plurality of axes.

In Example 34, the method for antenna pairing of any one of claim 33 is disclosed, wherein the first plurality of axes is identical to the second plurality of axes.

In Example 35, the method for antenna pairing of any one of claims 27 to 34 is disclosed, wherein the first plurality of antennas comprises at least three antennas arranged at least according to an x-axis, a y-axis, and a z-axis.

In Example 36, the method for antenna pairing of any one of claims 27 to 35 is disclosed, wherein the second plurality of antennas comprises at least three antennas arranged at least according to an x-axis, a y-axis, and a z-axis.

In Example 37, the method for antenna pairing of any one of claims 27 to 36 is disclosed, wherein the first plurality of antennas is in a base station.

In Example 38, the method for antenna pairing of any one of claims 27 to 37 is disclosed, wherein the second plurality of antennas is a plurality of antennas for an unmanned aerial vehicle.

In Example 39, the method for antenna pairing of any one of claims 27 to 37 is disclosed, wherein the second plurality of antennas is a plurality of antennas for a vehicle.

In Example 40, the method for antenna pairing of any one of claims 27 to 39 is disclosed, wherein the first plurality of antennas comprises linearly polarized antennas.

In Example 41, the method for antenna pairing of any one of claims 27 to 40 is disclosed, wherein the second plurality of antennas comprises linearly polarized antennas.

In Example 42, the method for antenna pairing of any one of claims 27 to 41 is disclosed, wherein the ordered set of transmissions is received from each of the first plurality of antennas in succession.

In Example 43, the method for antenna pairing of any one of claims 27 to 41 is disclosed, wherein the ordered set of transmissions is received from each of the first plurality of antennas simultaneously.

In Example 44, the method for antenna pairing of any one of claims 27 to 43 is disclosed, wherein an order of the ordered set of transmissions is known.

In Example 45, the method for antenna pairing of any one of claims 27 to 44 is disclosed, wherein the ordered set of transmissions is a 256 byte packet.

In Example 46, the method for antenna pairing of any one of claims 27 to 45 is disclosed, further comprising receiving the ordered set of transmissions every transmission frame.

In Example 47, the method for antenna pairing of claim 46 is disclosed, wherein the transmission frame is 5.5 milliseconds.

In Example 48, the method for antenna pairing of any one of claims 27 to 47 is disclosed, wherein an order of antennas transmitting from the second plurality of antennas is known.

In Example 49, the method for antenna pairing of any one of claims 27 to 48 is disclosed, wherein the order of antennas transmitting from the first plurality of antennas is known.

In Example 50, the method for antenna pairing of any one of claims 27 to 49 is disclosed, further comprising receiving a second ordered set of transmissions by the second plurality of antennas, from the first plurality of antennas; measuring a received signal strength of transmissions within the second ordered set of transmissions as received by the second plurality of antennas; identifying a second pairing transmission, the second pairing transmission being a transmission from the second ordered set of transmissions having a greatest received signal strength, according to the second signal strength measuring circuit; identifying an antenna of the second plurality of antennas from which the second pairing transmission was received; and resolving an origin antenna of the second pairing transmission from the first plurality of antennas.

In Example 51, a means for antenna pairing is disclosed, comprising a first plurality of antennas configured to receive an ordered set of transmissions; a signal strength measuring means, configured to measure a received signal strength of transmissions within the ordered set of transmissions as received by the first plurality of antennas; one or more processing means, configured to identify a pairing transmission, the pairing transmission being a transmission from the ordered set of transmissions having a received signal strength fulfilling a predefined criterion, according to the signal strength measuring means; and identify an antenna of the first plurality of antennas at which the pairing transmission was received.

In Example 52, the means for antenna pairing of claim 51 is disclosed, wherein the predefined criterion is that the pairing transmission is a transmission from the ordered set of transmissions having a greatest received signal strength.

In Example 53, the means for antenna pairing of any one of claim 51 or 52 is disclosed, wherein the one or more processing means are further configured to transmit a second ordered set of transmissions from the first plurality of antennas to the second plurality of antennas.

In Example 54, the means for antenna pairing of any one of claims 51 to 53 is disclosed, wherein the one or more processing means are further configured to resolve an origin antenna of the pairing transmission among the second plurality of antennas.

In Example 55, the means for antenna pairing of claim 54 is disclosed, wherein the one or more processing means are further configured to transmit an identity of the resolved origin antennas to the second plurality of antennas.

In Example 56, the means for antenna pairing of any one of claims 51 to 55 is disclosed, wherein the first plurality of antennas is further configured to receive the ordered set of transmission from a second plurality of antennas.

In Example 57, the means for antenna pairing of any one of claims 51 to 56 is disclosed, wherein the first plurality of antennas is arranged along a first plurality of axes.

In Example 58, the means for antenna pairing of any one of claims 51 to 57 is disclosed, wherein the second plurality of antennas is arranged along a second plurality of axes.

In Example 59, the means for antenna pairing of any one of claim 58 is disclosed, wherein the first plurality of axes is identical to the second plurality of axes.

In Example 60, the means for antenna pairing of any one of claims 51 to 59 is disclosed, wherein the first plurality of antennas comprises at least three antennas arranged at least according to an x-axis, a y-axis, and a z-axis.

In Example 61, the means for antenna pairing of any one of claims 51 to 60 is disclosed, wherein the second plurality of antennas comprises at least three antennas arranged at least according to an x-axis, a y-axis, and a z-axis.

In Example 62, the means for antenna pairing of any one of claims 51 to 61 is disclosed, wherein the first plurality of antennas is in a base station.

In Example 63, the means for antenna pairing of any one of claims 51 to 62 is disclosed, wherein the second plurality of antennas is a plurality of antennas of an unmanned aerial vehicle.

In Example 64, the means for antenna pairing of any one of claims 51 to 62 is disclosed, wherein the second plurality of antennas is a plurality of antennas of a vehicle.

In Example 65, the means for antenna pairing of any one of claims 51 to 64 is disclosed, wherein the first plurality of antennas comprises linearly polarized antennas.

In Example 66, the means for antenna pairing of any one of claims 51 to 65 is disclosed, wherein the second plurality of antennas comprises linearly polarized antennas.

In Example 67, the means for antenna pairing of any one of claims 51 to 66 is disclosed, wherein the one or more processing means are configured to receive the ordered set of transmissions from each of the first plurality of antennas in succession.

In Example 68, the means for antenna pairing of any one of claims 51 to 66 is disclosed, wherein the one or more processing means are further configured to receive the ordered set of transmissions from each of the first plurality of antennas simultaneously.

In Example 69, the means for antenna pairing of any one of claims 51 to 68 is disclosed, wherein an order of the ordered set of transmissions is known to the one or more processing means.

In Example 70, the means for antenna pairing of any one of claims 51 to 69 is disclosed, wherein the ordered set of transmissions is a 256 byte packet.

In Example 71, the means for antenna pairing of any one of claims 51 to 70 is disclosed, wherein the one or more processing means are configured to receive the ordered set of transmissions every transmission frame.

In Example 72, the means for antenna pairing of claim 69 is disclosed, wherein the transmission frame is 5.5 milliseconds.

In Example 73, the means for antenna pairing of any one of claims 51 to 72 is disclosed, wherein an order of antennas transmitting from the second plurality of antennas is known to the one or more processing means for the first plurality of antennas.

In Example 74, the means for antenna pairing of any one of claims 53 to 73 is disclosed, wherein the order of antennas transmitting from the first plurality of antennas is known to the one or more processing means for the second plurality of antennas.

In Example 75, the means for antenna pairing of any one of claims 51 to 74 is disclosed, further comprising the second plurality of antennas, configured to receive a second ordered set of transmissions from the first plurality of antennas; a second signal strength measuring means, configured to measure a received signal strength of transmissions within the second ordered set of transmissions as received by the second plurality of antennas; one or more second processing means, configured to identify a second pairing transmission, the second pairing transmission being a transmission from the second ordered set of transmissions having a greatest received signal strength, according to the second signal strength measuring means; and identify an antenna of the second plurality of antennas at which the second pairing transmission was received.

In Example 76, a means for antenna pairing is disclosed, comprising a first station, further comprising a first plurality of antennas configured to receive an ordered set of transmissions; a signal strength measuring means, configured to measure a received signal strength of transmissions within the ordered set of transmissions as received by the first plurality of antennas; one or more processing means, configured to identify a pairing transmission, the pairing transmission being a transmission from the ordered set of transmissions having a received signal strength fulfilling a predefined criterion, according to the signal strength measuring means; and identify an antenna of the first plurality of antennas at which the pairing transmission was received; and the second station, further comprising the second plurality of antennas configured to receive a second ordered set of transmissions; a second signal strength measuring means, configured to measure a received signal strength of transmissions within the second ordered set of transmissions as received by the second plurality of antennas; one or more second processing means, configured to identify a second pairing transmission, the second pairing transmission being a transmission from the second ordered set of transmissions having a received signal strength fulfilling a predefined criterion, according to the second signal strength measuring means; and identify an antenna of the second plurality of antennas at which the second pairing transmission was received.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. An antenna pairing system comprising:
    a first plurality of antennas configured to each sequentially receive an ordered transmission set of a plurality of ordered transmission sets, each ordered transmission set comprising sequential transmissions from each of a plurality of transmit antennas;
    a signal strength measuring circuit, configured to measure a received signal strength of the sequential transmission of the ordered transmission sets;
    one or more processors, configured to
    identify a pairing transmission, the pairing transmission comprising a transmission in an ordered transmission set of the plurality of ordered transmission sets having a received signal strength fulfilling a predefined criterion, according to the signal strength measuring circuit;
    identify an antenna of the first plurality of antennas corresponding to the pairing transmission; and
    identify a transmit antenna of the plurality of transmit antennas corresponding to the pairing transmission;
    wherein sequentially receiving an ordered transmission set of a plurality of ordered transmission sets comprises receiving transmissions from each of the plurality of transmit antennas on a first receive antenna, and subsequently receiving transmissions from each of the plurality of transmit antennas on a second receive antenna.

2. The antenna pairing system of claim 1, wherein the predefined criterion is that the pairing transmission is a transmission of the plurality of ordered transmission sets having a greatest received signal strength.

3. The antenna pairing system of claim 1, wherein the one or more processors are further configured to transmit an identity of the transmit antenna of the plurality of transmit antennas corresponding to the pairing transmission to the plurality of transmit antennas.

4. The antenna pairing system of claim 1, wherein the first plurality of antennas and the plurality of transmit antennas comprise at least three antennas arranged at least according to an x-axis, a y-axis, and a z-axis.

5. The antenna pairing system of claim 1, wherein the plurality of transmit antennas comprises at least three antennas arranged at least according to an x-axis, a y-axis, and a z-axis.

6. The antenna pairing system of claim 1, wherein the first plurality of antennas is in a base station.

7. The antenna pairing system of claim 1, wherein the first plurality of antennas is a plurality of antennas of an unmanned aerial vehicle.

8. The antenna pairing system of claim 1, wherein the first plurality of antennas and the plurality of transmit antennas comprise linearly polarized antennas.

9. The antenna pairing system of claim 1, wherein the one or more processors are configured to receive the ordered set of transmissions from each of the first plurality of antennas in succession.

10. The antenna pairing system of claim 1, wherein an order of the ordered set of transmissions is known to the one or more processors.

11. The antenna pairing system of claim 1, further comprising:
the plurality of transmit antennas, configured to receive a second ordered set of transmissions from the first plurality of antennas;
a second signal strength measuring circuit, configured to measure a received signal strength of transmissions within the second ordered set of transmissions as received by the plurality of transmit antennas;
one or more second processors, configured to identify a second pairing transmission, the second pairing transmission being a transmission from the second ordered set of transmissions having a greatest received signal strength, according to the second signal strength measuring circuit; and identify an antenna of the second plurality of antennas at which the second pairing transmission was received.

12. The antenna pairing system of claim 1, wherein each of the first plurality of antennas are configured to transmit a polarized signal; wherein a first antenna of the first plurality of antennas has a first polarization; wherein the first linear polarization is one of a primarily vertical polarization, a primarily horizontal polarization, or a circular polarization; wherein a second antenna of the first plurality of antennas has a second polarization, wherein the second polarization one of a primarily vertical polarization, a primarily horizontal polarization, or a circular polarization, and wherein the second polarization is different from the first polarization.

13. The antenna pairing system of claim 12, wherein the first antenna is oriented about a first axis and the second antenna is oriented about a second axis, perpendicular to the first axis; further comprising a third antenna of the first plurality of antennas, oriented about a third axis that is perpendicular to both the first axis and the second axis.

14. A method for antenna pairing comprising:
sequentially receiving on a first plurality of antennas an ordered transmission set of a plurality of ordered transmission sets, each ordered transmission set comprising sequential transmissions from each of a plurality of transmit antennas;
measuring a received signal strength of the ordered transmission sets;
identifying a pairing transmission, the pairing transmission comprising a transmission from the ordered transmission set of the plurality of ordered transmission sets having a received signal strength fulfilling a predefined criterion; and
identifying an antenna at which the pairing transmission was received; and
identifying a transmit antenna of the plurality of transmit antennas corresponding to the pairing transmission;
wherein sequentially receiving an ordered transmission set of a plurality of ordered transmission sets comprises receiving transmissions from each of the plurality of transmit antennas on a first receive antenna, and subsequently receiving transmissions from each of the plurality of transmit antennas on a second receive antenna.

15. The method for antenna pairing of claim 14, wherein the predefined criterion is that the pairing transmission is a transmission from the plurality of ordered transmission sets having a greatest received signal strength.

16. The method for antenna pairing of claim 14, further comprising transmitting a second ordered set of transmissions from the first plurality of antennas to a second plurality of antennas.

17. The method for antenna pairing of claim 14, further comprising transmitting an identity of ordered set of antennas to the second plurality of antennas.

18. A unmanned aerial vehicle system, comprising
a first unmanned aerial vehicle, comprising:
a plurality of transmit antennas; and
one or more processors, configured to control the first unmanned aerial vehicle to transmit via the plurality of transmit antennas an ordered transmission set of a plurality of ordered transmission sets, each ordered transmission set comprising sequential transmissions from each of the plurality of transmit antennas; and
a second unmanned aerial vehicle, comprising:
a plurality of receive antennas configured to each sequentially receive an ordered transmission set of a plurality of ordered transmission sets, each ordered transmission set comprising sequential transmissions from each of the plurality of transmit antennas;
a signal strength measuring circuit, configured to measure a received signal strength of the sequential transmission of the ordered transmission sets;
one or more processors, configured to
identify a pairing transmission, the pairing transmission comprising a transmission in an ordered transmission set of the plurality of ordered transmission sets having a received signal strength fulfilling a predefined criterion, according to the signal strength measuring circuit;
identify an antenna of the plurality of transmit antennas corresponding to the pairing transmission; and
identify a transmit antenna of the plurality of transmit antennas corresponding to the pairing transmission;
wherein sequentially receiving an ordered transmission set of a plurality of ordered transmission sets comprises receiving transmissions from each of the plurality of transmit antennas on a first receive antenna, and subsequently receiving transmissions from each of the plurality of transmit antennas on a second receive antenna.

* * * * *